(No Model.)
R. M. KEATING.
AUTOMATIC INFLATING DEVICE FOR RUBBER TIRES.
No. 491,563. Patented Feb. 14, 1893.
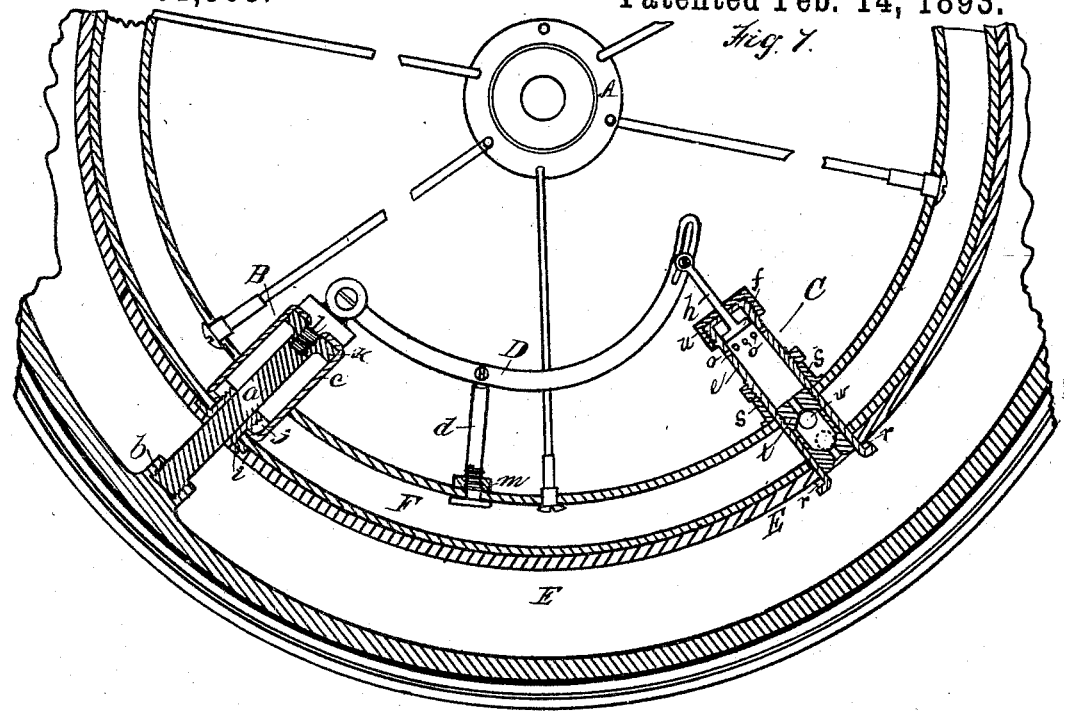
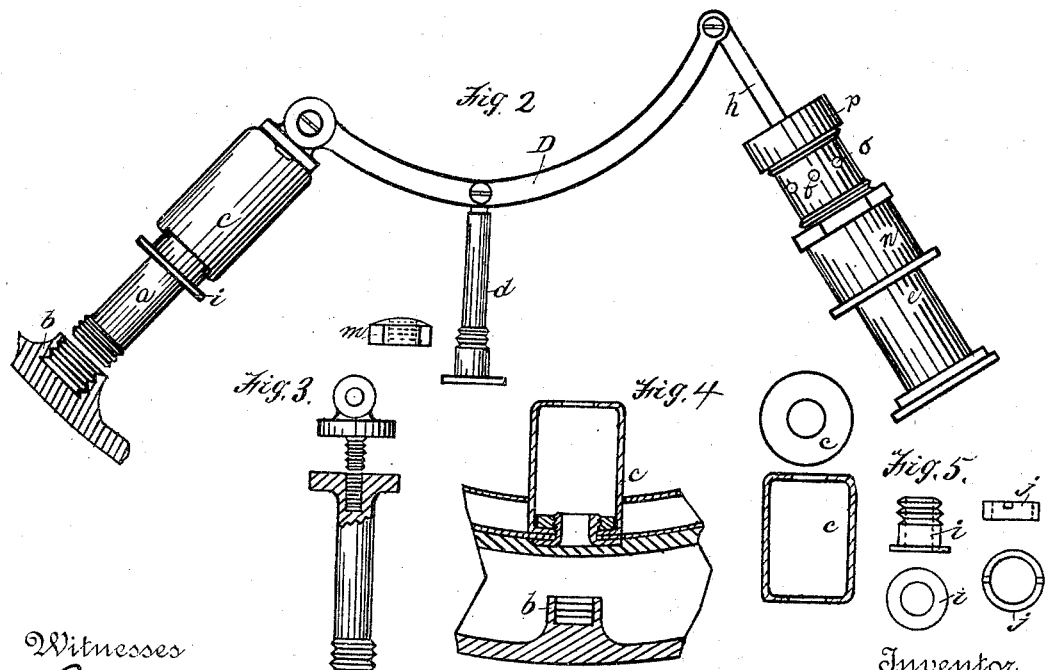
Witnesses
Robt Ruddell
E. M. Power
Inventor
Robert M. Keating
by Allen Webster
Attorney
THE NORRIS PETERS CO., PHOTO-LITHO., WASHINGTON, D. C.

UNITED STATES PATENT OFFICE.

ROBERT M. KEATING, OF SPRINGFIELD, MASSACHUSETTS.

AUTOMATIC INFLATING DEVICE FOR RUBBER TIRES.

SPECIFICATION forming part of Letters Patent No. 491,563, dated February 14, 1893.

Application filed December 5, 1891. Serial No. 414,075. (No model.)

*To all whom it may concern:*

Be it known that I, ROBERT M. KEATING, a citizen of the United States, residing at Springfield, in the county of Hampden and State of Massachusetts, have invented new and useful Improvements in Automatic Inflating Devices for Pneumatic Tires, of which the following is a specification, reference being had to the accompanying drawings and letters of reference marked thereon.

My invention relates to a class of devices designed to automatically inflate with air the hollow flexible tires of bicycles and other vehicles without impeding appreciably the motion of the machine. I accomplish the objects of my invention by the construction herein shown.

In the accompanying drawings in which like letters of reference indicate like parts: Figure 1 is a vertical section, showing a portion of a wheel with my device attached thereto. Fig. 2 is a side view in full lines on an enlarged scale of the operative device detached from the wheel. Fig. 3 is a view in detail of the connecting rod detached. Fig. 4 is a sectional view of the collapsible sleeve showing the mode of attachment of the same to the rim, and Fig. 5 is a view illustrating other parts of the device in detail, the same being suitably indicated by letters of reference.

Referring now to the drawings in detail A indicates a wheel hub, B indicates the actuating element for operating the pump, C indicates the pump, D a fulcrumed lever, E the tire, and F the rim.

$a$ indicates an actuating rod, $b$ a boss upon the tire to which the same is attached, $c$ a collapsible sleeve, $d$ a support upon which the lever is fulcrumed, $e$ a pump cylinder, $f$ a piston head and $h$ a piston rod.

Encircling the metal rim F is the flexible and hollow tire E adjusted to its seat in the usual manner. The tire is preferably provided upon its interior with a boss $b$ to which I attach a connecting rod $a$, which is preferably threaded and secured to the boss $b$ by being screwed therein. The connecting rod extends toward the center of the wheel passing through openings in the tire and rim adapted for that purpose.

Mounted within the rim and projecting through the inner wall of the tire I arrange a pump barrel $e$, the same being provided with a piston $f$ and piston rod $h$.

At some convenient intermediate point between the actuating mechanism and the pump mechanism I provide a standard $d$, upon which is fulcrumed the operative lever D in such manner that the short arm of the lever is connected with the operative mechanism and the long arm with the pump mechanism.

Although various methods may be devised for preventing the escape of air from the interior of the tire through the opening provided for the passage of the connecting rod $a$ I prefer to employ a collapsible sleeve $c$, which is made of rubber or other suitable material, the same being attached to the tire by the employment of a ring $i$ provided with a flange at one end, and adapted to receive a nut $j$ at its opposite end between which nut and the flange one end of the collapsible sleeve $c$ is grasped. The opposite end of the collapsible sleeve is held between the enlarged end $k$ of the connecting rod $a$, and the face of the screw cap $l$. The screw cap $a$ is provided with means for connecting the same pivotally with the fulcrumed lever D.

The pump barrel $e$ is provided at its inner end with an annular outwardly turned flange and a packing ring $r$ is arranged between said flange and the wall of the tire so that when the pump barrel is drawn outwardly the packing ring is compressed against the inner wall of the tire and an air tight connection made thereby. The exterior of the pump barrel is threaded near its central portion to receive a nut $s$ which is set down against the exterior of the inner wall of the rim, thus drawing the pump barrel outwardly and compressing the packing ring as before stated.

The pump barrel may be provided with any convenient system of valves. I prefer, however, to employ a core $t$, the same being exteriorly threaded and the interior wall of the pump barrel being threaded to receive said threaded portion of the core. The core $t$ is provided with a valve seat and a rubber ball, the operation of which is too well known to require description herein.

The piston head $f$ fits snugly within the pump barrel and is provided with a piston rod $h$ which is pivotally connected at its free end with the long arm of the lever D.

The pump barrel is provided with perforations o through which the air rushes into the pump barrel when the piston is drawn outwardly a sufficient distance to open said inlets, and when the piston head is forced downwardly it passes the inlet openings and the air below said openings will be compressed and forced through the openings in the core t into the tire, and the action of the air after passing the valve w will cause the valve to return to its seat, and thus effectually prevent the return of the air.

The pump barrel is provided with a cap u provided with an opening to allow the free passage of the piston rod. To allow for lateral motion I prefer to slot the end of the lever D where it engages the piston rod h, but it will readily be seen that the piston rod may be hinged or otherwise constructed to allow sufficient lateral motion and the slot in the end of the lever be avoided. The post d to which the lever is fulcrumed is supported on the rim by being provided at its end with a flange and a nut m being screwed down to hold the same firmly in position as shown in Fig. 1.

It will readily be seen that the position of the pump with reference to the fulcrumed point of the lever may be greatly varied and that the position of the actuating mechanism may also be varied so that a comparatively trifling motion being imparted to the lever d through the medium of the connecting rod a will give sufficient throw to the piston to force a considerable amount of air into the tire at each stroke, and that one stroke will be had at each revolution of the wheel. It will also be seen that all danger of overstraining the tire is avoided, owing to the fact that when a sufficient amount of air has been forced into the tire, to give the same a great degree of rigidity that the connecting rod a will not be moved from its position by the revolution of the wheel as the tire will not be collapsed to any appreciable extent, and that when the pressure within the tire is insufficient then greater motion will be imparted to the connecting rod a, and a greater amount of air forced in at each revolution until the desired pressure within the tire is attained.

Having therefore described my invention, what I claim and desire to secure by Letters Patent is:

1. In combination with a wheel and hollow tire, a pump, an actuating device having a rod attached to the inner wall of the outer portion of the tire and a fulcrumed lever connecting the pump and actuating device substantially as described.

2. In an inflating device for pneumatic tires the combination of a connecting rod a, and collapsible sleeve c arranged as shown, a pump and suitable connecting mechanism substantially as and for the purposes stated.

3. The combination of an actuating mechanism, a pump and a fulcrumed lever, the short arm of which is attached to the actuating mechanism and the long arm to the pump all in combination with a wheel and pneumatic tire substantially as shown.

4. The combination with a wheel of a hollow collapsible tire, a pump mounted upon said wheel and a rod for actuating said pump, one end of which rod is secured to the interior portion of said tire and suitable air passages and connecting mechanism, substantially as shown.

5. The combination of a wheel having an inflatable tire, with an actuating device and pump, the pump having connection with the tire and the actuating mechanism being mounted upon the rim and connected with the tire, by a rod passing through the inner wall of the tire and connecting with the outer wall or tread and means to communicate motion from the actuating mechanism to the pump substantially as described.

6. The combination of the pump barrel provided with an annular outwardly turned flange, a hollow tire and a rim each provided with an opening to receive the pump, and a collar as s mounted upon the pump body to compress the rim and inner tire wall between said collar and flange, a fulcrumed lever to operate the pump and means to operate said lever substantially as and for the purposes stated.

7. The combination of a wheel and a hollow tire provided with openings for the operation of the connecting rod, with a collar i provided with an annular flange and arranged to engage the inner wall of the tire and a nut j and sleeve c one end of which sleeve is grasped between the nut j and flange upon the collar i substantially as shown.

ROBERT M. KEATING.

Witnesses:
ALLEN WEBSTER,
ROBT. RUDDELL.